Figure 1:
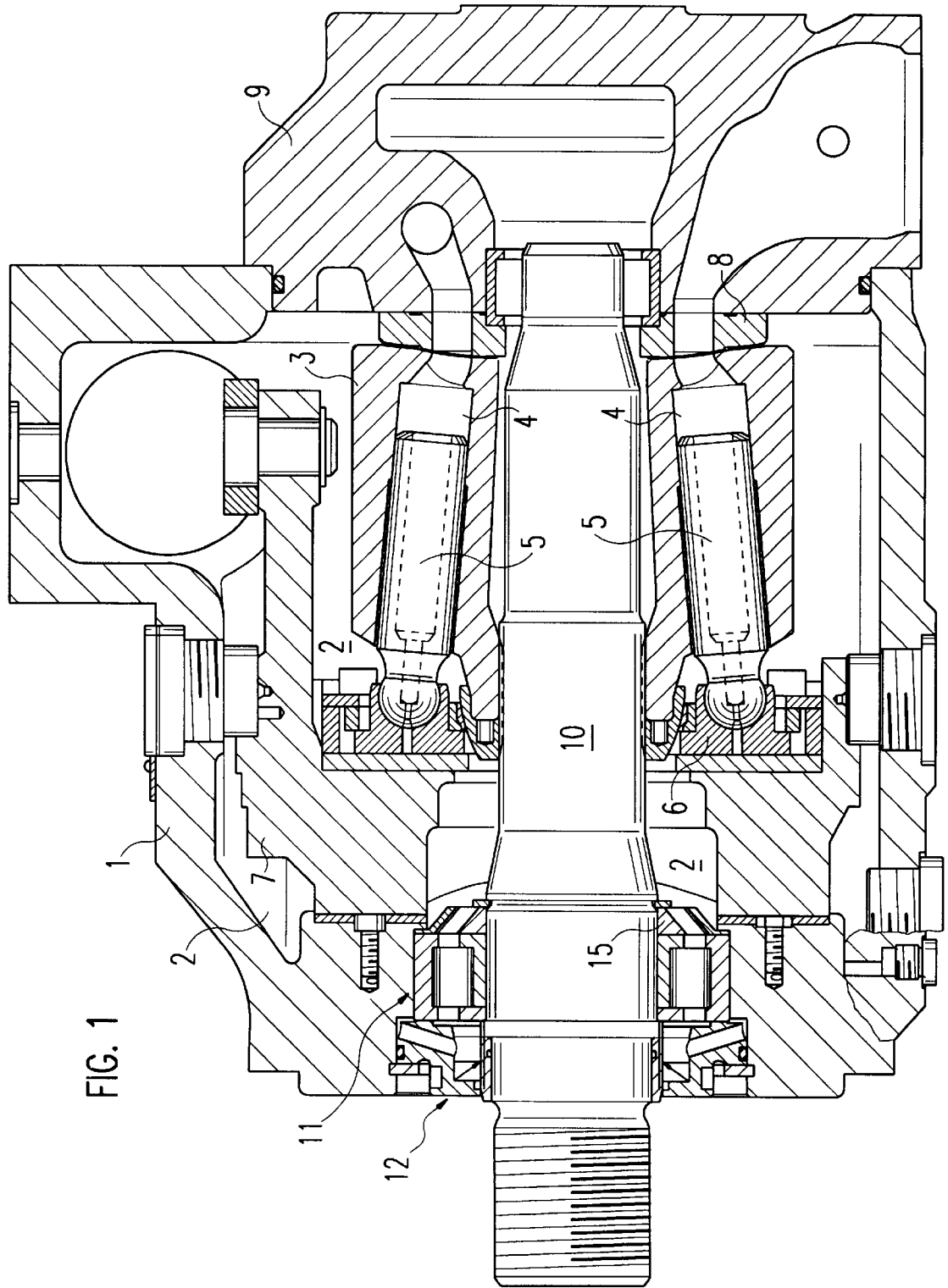

United States Patent [19]
Beck

[11] Patent Number: 6,077,050
[45] Date of Patent: Jun. 20, 2000

[54] AXIAL PISTON MACHINE WITH INTERNAL FLUSHING CIRCUIT

[75] Inventor: Josef Beck, Haigerloch, Germany

[73] Assignee: Brueninghaus Hydromatik GmbH, Elchingen, Germany

[21] Appl. No.: 09/125,121

[22] PCT Filed: Feb. 21, 1997

[86] PCT No.: PCT/EP97/00853

§ 371 Date: Aug. 11, 1998

§ 102(e) Date: Aug. 11, 1998

[87] PCT Pub. No.: WO97/38225

PCT Pub. Date: Oct. 16, 1997

[30] Foreign Application Priority Data

Apr. 4, 1996 [DE] Germany ............................ 196 13 609

[51] Int. Cl.[7] ........................................................ F04B 1/12
[52] U.S. Cl. .................................. 417/269; 417/201; 92/72
[58] Field of Search .................................... 417/269, 201, 417/222.2; 92/72; 184/6.28

[56] References Cited

U.S. PATENT DOCUMENTS

| | | | |
|---|---|---|---|
| 4,005,948 | 2/1977 | Hiraga et al. | 417/269 |
| 4,413,954 | 11/1983 | Okazaki | 417/269 |
| 5,411,385 | 5/1995 | Eto et al. | 418/96 |
| 5,971,717 | 10/1999 | Berthold | 417/269 |

*Primary Examiner*—Henry C. Yuen
*Assistant Examiner*—Mahmoud M Gimie
*Attorney, Agent, or Firm*—Scully, Scott, Murphy & Presser

[57] ABSTRACT

The invention relates to an axial piston machine, preferably of swash plate construction, having a revolving cylinder drum (3) arranged on a drive shaft (10). The roller bearing (11) of the drive shaft (10) is force flushed from the housing inner chamber (2) with leakage operating medium. Outside the roller bearing (11) there is arranged a shaft sealing arrangement (12) and there is provided a device for conveying operating medium through the bearing gap of the roller bearing (11). For this purpose a conveyor plate (15) is arranged next to the roller bearing (11) on the drive shaft (10) of the machine.

11 Claims, 4 Drawing Sheets

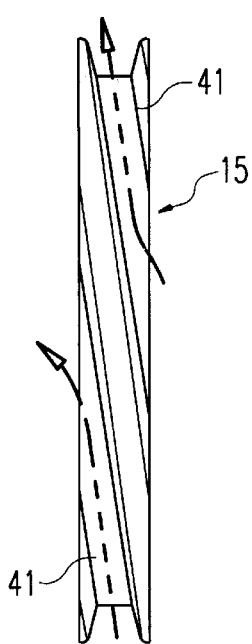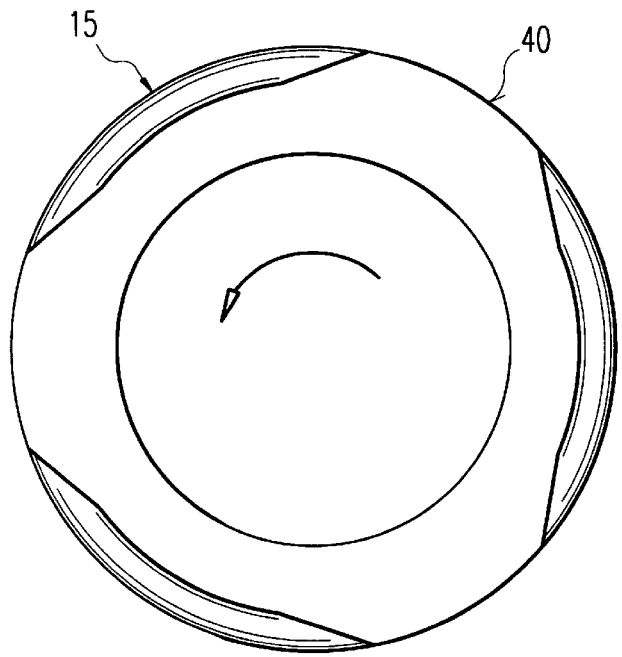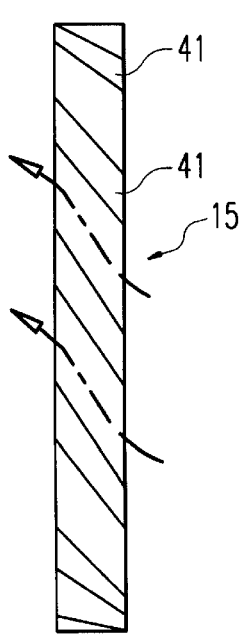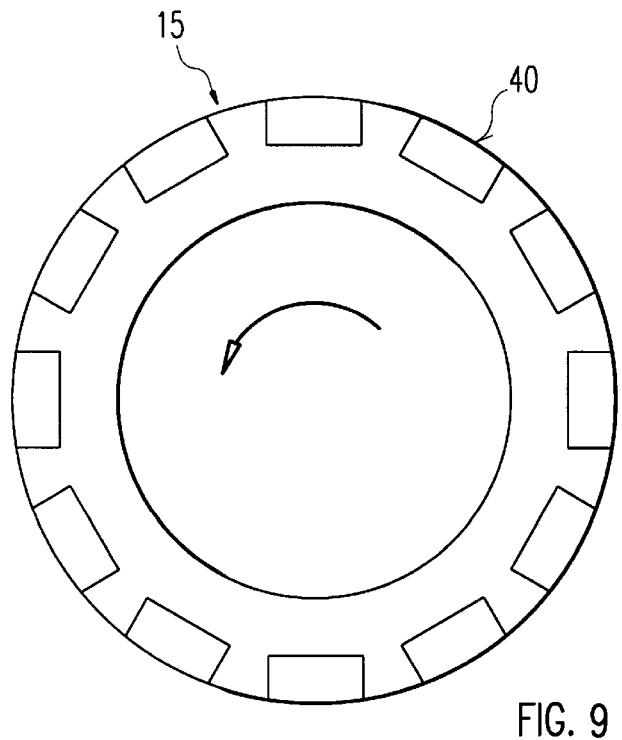
FIG. 8　　　　FIG. 7
FIG. 10　　　　FIG. 9

AXIAL PISTON MACHINE WITH INTERNAL FLUSHING CIRCUIT

The invention relates to an axial piston machine, preferably of swash plate construction, with a revolving cylinder drum arranged on the drive shaft and working pistons supported via slippers on a swash plate the tilt angle of which may, if appropriate, be adjustable, with which machine the housing inner chamber of the pump housing, filled with leakage operating medium, is bounded by a roller bearing by means of which the drive shaft is mounted in the pump housing, and there is arranged outside the roller bearing a shaft sealing arrangement, and in which there is provided a device for the conveying of operating medium through the bearing gap of the roller bearing.

With axial piston machines of this kind, for critical applications, which are for example operation of the machine at high temperatures, operation with operating media containing water and particular demands on the operating time and reliability, there is needed an external bearing flushing, by way of an external connection. Such an external flushing serves, apart from bearing lubrication, simultaneously to cool the shaft sealing arrangement, for lubrication and to avoid possible deposits on the sealing lip. Such an external cooling and lubrication is complex, since in particular adaptation to the operating state of the pump is necessary in each case.

In U.S. Pat. No. 2,825,499 there is described a cooling compressor in the form of an axial piston pump of the kind mentioned in the introduction. There, between the roller bearing for the drive shaft and the shaft sealing arrangement, sealing off the drive shaft with regard to the housing from the exterior, a toothed wheel pump. This toothed wheel pump sucks operating medium out of the housing inner chamber and conveys it to the shaft sealing arrangement for cooling and lubrication. In order to return the operating medium into the housing inner chamber there is provided a channel which returns the operating medium from the space before the shaft seal through the bearing gap of the roller bearing into the housing inner chamber. Thus, an internal flushing circuit is provided which, however, has the disadvantage that a separate small, complete pump device, consisting of rotor and stator, is provided. This is complex in terms of construction and has the further disadvantage that in the region of the axial piston pump in which, according to experience, the greatest build up of heat occurs there is arranged a further machinery unit between roller bearing and shaft seal which takes up construction space. Finally, by means of the additional flushing pump device the operating medium is transported directly against the shaft sealing arrangement, so that there is needed a very fine tuning in the setting up of the conveying capacity of the flushing pump device, in order to have a desired flushing and cooling for all ranges of speed of rotation of the axial piston pump.

The object of the invention is to provide an internal forced flushing circuit in an axial piston machine of the kind mentioned, for which no additional constructional space is necessary and which is effective non-critically for all speed of rotation operating ranges of the axial piston machine.

To achieve this object, an axial piston machine having the features of the preamble of claim 1 is characterised in that there is provided a conveyor plate revolving with the drive shaft, before the bearing gap of the roller bearing on the side of the housing inner chamber, which conveyor plate urges the operating medium through the bearing gap in the annular chamber between roller bearing and shaft sealing arrangement, and in that the annular chamber is connected with the housing inner chamber by means of a discharge channel.

This configuration ensures a flushing medium quantity which is dependent upon the speed of rotation, both for the roller bearing and also for the shaft sealing arrangement, i.e. a larger quantity of operating medium is conveyed at higher speeds of rotation and correspondingly occurring greater heat generation. Also, the quantity conveyed increases when the viscosity of the operating medium becomes less at higher temperatures. No additional line connections are needed for the flushing pump device and there is no additional demand for space for the conveyor plate in accordance with the invention, since the plate lies in the leakage oil chamber of the housing inner chamber, which is already present, before the roller bearing. Only one additional component is needed, in the form of the conveyor plate which can be economically manufactured as a forged part, sintered part or close grained or die cast part.

The invention is based upon the insight that with modern axial piston machines of this kind of construction, which are operated at high pressures and high speeds of rotation, the housing inner chamber, as leakage oil chamber for the operating medium, is always completely filled with leakage operating medium. It is thus not necessary to provide a special pump device for an internal forced flushing; rather it suffices to provide for a flow of operating medium by way of conveying means—here, in accordance with the invention, a conveyor plate revolving with the drive shafts. An additional advantage of the arrangement of the conveyor disk in accordance with the invention is found in that the flushing medium flow from the conveyor plate in accordance with the invention is first taken through the roller bearing and only then to the shaft sealing arrangement, which is more sensitive to pressure and quantity variations of the flushing medium flow.

Figure 2:
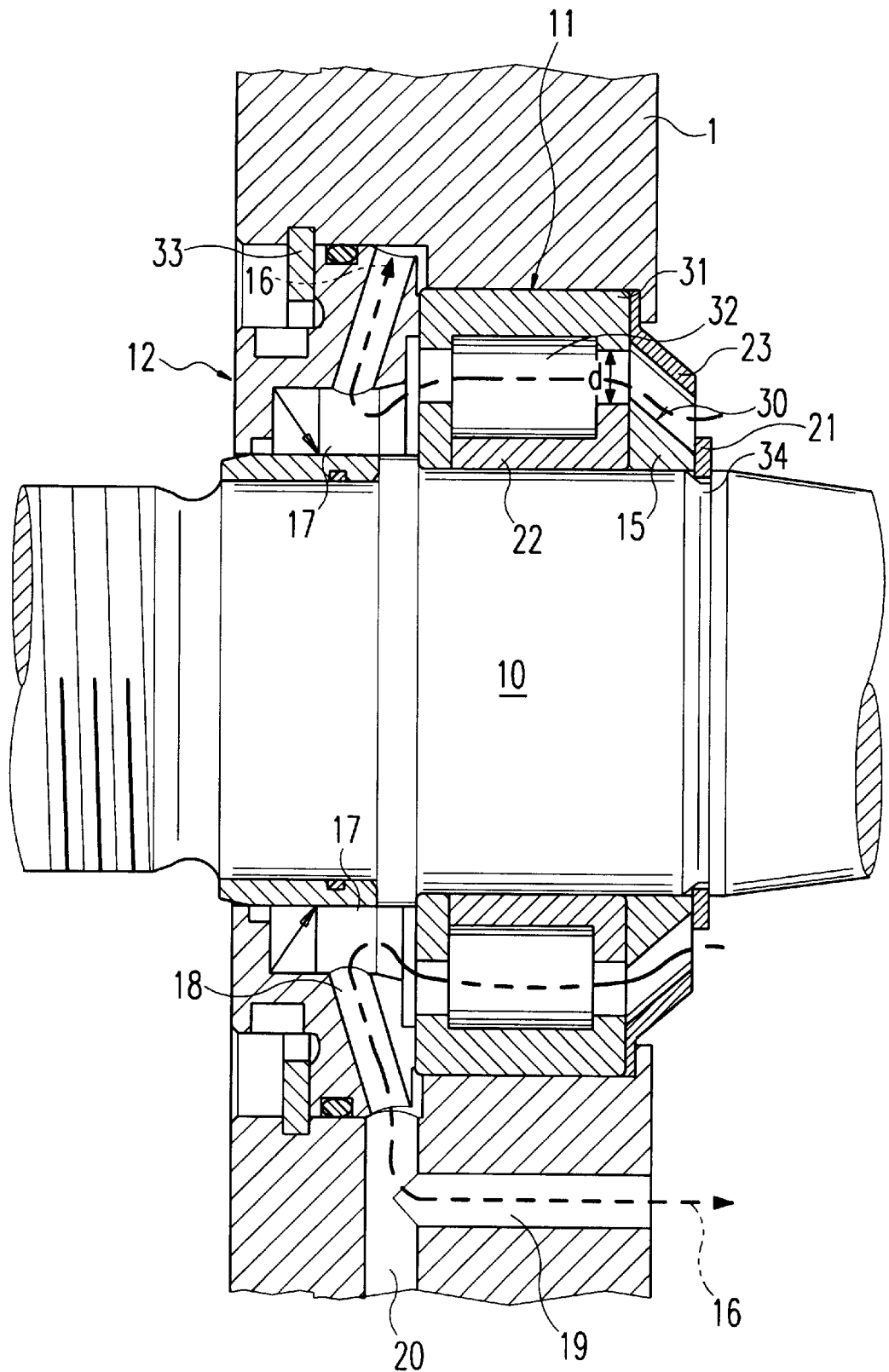
Figure 4:
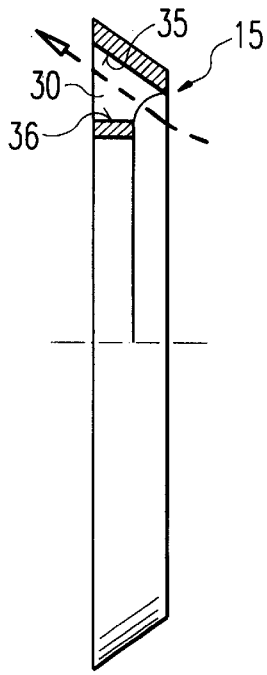
Figure 3:
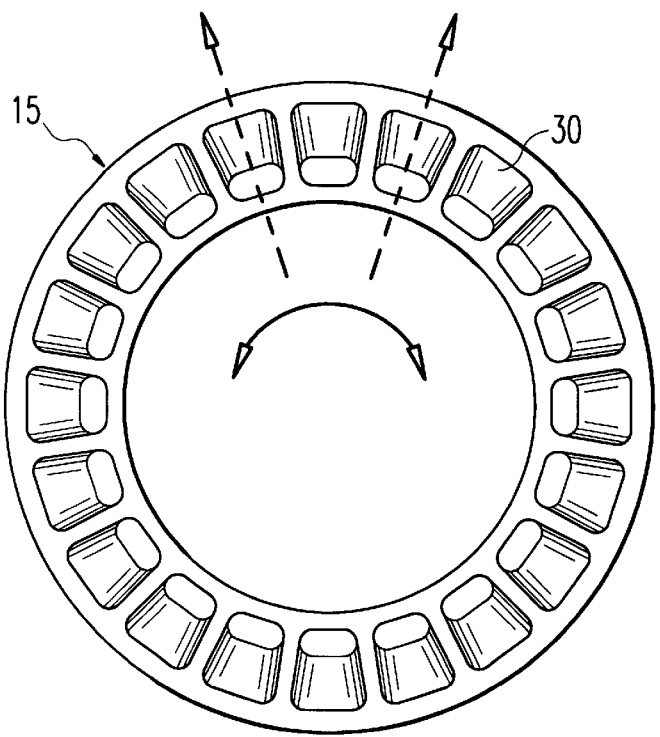
Figure 6:
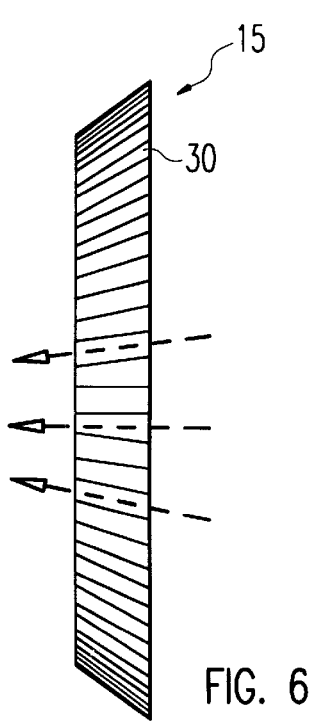
Figure 5:
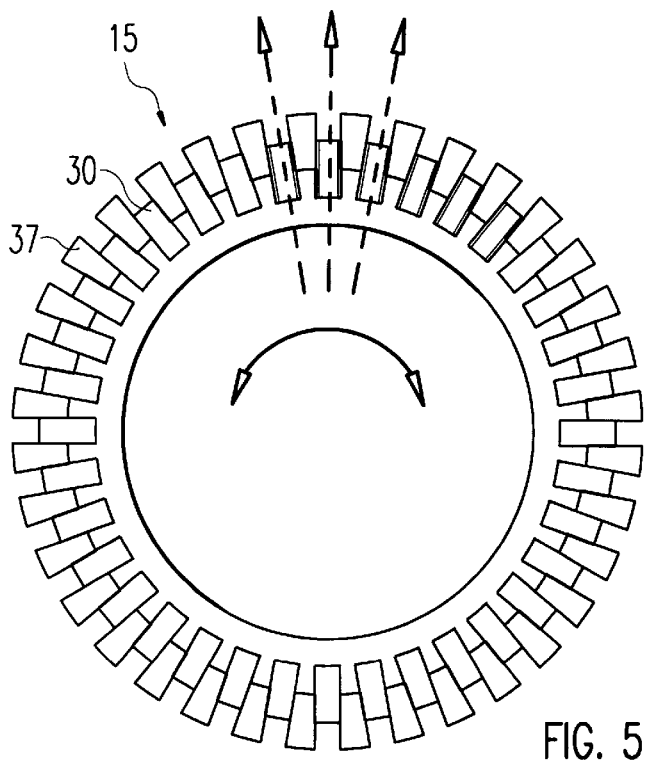

Expedient configurations of the invention are indicated in the subclaims. Exemplary embodiments of the invention are described in more detail below with reference to the accompanying drawings, which show:

FIG. 1 an axial piston machine with internal flushing medium circuit in accordance with the invention, schematically in section;

FIG. 2 as a detail to the larger scale, a schematic sectional view of the bearing region of the axial piston machine according to FIG. 1, FIG. 3 a side view and FIG. 4 an end view of a first configuration of the conveyor plate FIG. 5 a side view and FIG. 6 an end view of a second configuration of the conveyor plate FIG. 7 a side view and FIG. 8 an end view of a third configuration of the conveyor plate, and FIG. 9 a side view and FIG. 10 an end view of a fourth configuration of the conveyor plate.

The axial piston machine illustrated in section in FIG. 1 is of conventional construction and consists of a housing 1 with a cylinder drum 3 rotatably arranged in the housing inner chamber 2, the cylinder drum having pistons 5 moveable back and forth in cylinder chambers 4, which pistons bear on a tiltable swash plate body 7 via slippers 6. On the right in FIG. 1, a control plate 8 adjoins the cylinder drum 3, which control plate borders on the housing cover 9 having the supply and discharge channels. All these parts of an axial piston machine are conventional and do not need to be described here in terms of their functional cooperation.

The cylinder drum 3 sits rotationally fixed on the drive input or drive output shaft, designated as drive shaft 10, which is mounted in the housing 1 by way of a roller bearing 11 or a roller bearing arrangement. Outside the roller bearing 1 the housing inner chamber 2, filled with leakage oil, is sealed by means of a shaft sealing arrangement 12. The region of the roller bearing 11 and the shaft seal 12 is shown in FIG. 2 to a larger scale. The roller bearing 11 or a corresponding roller bearing arrangement, is the region of greatest heat development of the axial piston machine and roller bearing 11 and shaft seal 12 are to be cooled and flushed since they are the region with the greatest risk of wear for the working life of the whole machine. In order to attain a cooling and flushing circuit by means of the leakage medium, which is at the same time the operating medium of the machine, there is arranged with the configuration in accordance with the invention a conveyor plate 15 on the drive shaft 10 directly neighbouring the roller bearing 11 on the side towards the housing inner chamber 2, which conveyor plate conveys leakage oil out of the housing inner chamber 2—as indicated by arrow 16—through the roller bearing 11 into the space 17 between roller bearing and shaft seal 12. From there the medium returns into the housing inner chamber 2 through channels 18 and 19. Between the channels 18 and 19 a flushing oil channel 20 branches off, which can be connected at the outside of the housing, if appropriate, to an external flushing oil circuit.

The conveyor plate 15 can be attached to the drive shaft 10, as illustrated, by means of a clamping ring 21 or it may also be directly connected with the inner bearing ring 22 of the roller bearing 11.

In FIGS. 3 to 10 further configurations of this conveyor plate 15 are illustrated, whereby when the conveyor plate 15 is configured as a centrifugal force conveyor ring open outwardly at the end, there may be arranged a screening ring 23, as shown in FIG. 2, covering the conveyor plate 15 radially outwardly.

In FIGS. 3 to 10 the possible directions of rotation of the conveyor plate 15 are indicated by thick, full-line arrows and the conveyed flow of the flushing oil is indicated by thick broken-line arrows. As can be seen, the first and second configurations of the conveyor plate 15, corresponding to the illustrations in FIGS. 3 to 6, are suitable for both directions of rotation of the shaft 10, since their conveying effect is based upon the centrifugal force applied to the leakage oil. The conveyor plates 15 formed as conveyor threads according to FIGS. 7 to 10 can be seen to be suitable for only one direction of rotation. The five illustrated configurations of the conveyor plate 15 are only exemplary. By means of formation and selection of the suitable conveyor plate 15 the forced flushing circuit can be optimised in simple manner for different capacities of machine and for their uses in each case.

In the exemplary embodiment illustrated in FIG. 2, the conveyor plate 15 has a number of axial through-channels 30 uniformly distributed around the plate circumference which channels conically rise towards the roller bearing 11. The screening ring 23 covers over the through-channels 30, whereby the screening ring 23 likewise widens conically towards the roller bearing 11. In the exemplary embodiment illustrated in FIG. 2 the through-channels 30 are thus formed as peripheral grooves which are closed radially by means of the screening ring 23. The axial through-channels 30 widen in the direction towards the roller bearing 11. This facilitates the entry of the operating medium into the relatively narrow gap of the roller bearing 11.

From FIG. 2 a further advantage of the conveyor plate 15 in accordance with the invention can be recognised. The roller bearing 11 includes an inner bearing ring 22, engaging the drive shaft 10, and an outer bearing ring 31 between which the roller elements 32 are arranged. The inner bearing ring 22 and the outer bearing ring 31 are shaped, in the exemplary embodiment illustrated in FIG. 2, to be L-shaped in cross-section, in order to attain an axial guiding of the roller elements 32. The position of the outer bearing ring 31 is fixed to the housing 1 by means of the shaft sealing arrangment 12 via a first securing means 33, e.g. a clamping ring. In practice there is the problem that the axial seating of the inner bearing ring 22 is determined only within a relatively large window of tolerance. The tolerance of the axial seating of the inner bearing ring 22 is provided through addition of the manufacturing tolerances of the clamping ring 33, the shaft seal 12, the outer bearing ring 31, the roller elements 32 and finally the inner bearing ring 22 itself. In the axial fixing of the inner bearing ring 22 on the drive shaft 10 the axial position of the inner bearing ring 22, varying within the relatively large window of tolerance, is to be compensated. For this purpose suitable compensating elements are provided.

In accordance with a further development according to the invention there is offered the possibility to employ the conveyor plate 15 as a compensating plate, which can be adjusted in terms of its axial dimension, for compensating the manufacturing tolerances determining the axial seat of the inner bearing ring 22. Thereby, the conveyor plate 15 is arranged between the inner bearing ring 22 and a second securing means 21 in each case closely bearing thereupon. The second securing means 21 may for example be formed as a clamping ring which engages into a groove 34 provided on the drive shaft. The axial seat of the inner bearing ring 22 is thus determined by the axial dimension of the conveyor plate 15. By adaptation of the axial dimension of the conveyor plate 15 to the axial seat of the inner bearing ring 22 of a particular axial piston machine to be manufactured, the axial bearing play of the roller bearing 11 can thus be reduced without further components, such as tolerance compensation plates, being necessary therefor.

For this purpose, the conveyor plates 15 can be manufactured with slightly varying, different axial dimensions. Upon assembly then in each case for a particular axial piston machine to be installed, there is determined the exact spacing between the end surface of the inner bearing ring 22, on the right in FIG. 2, and the end surface of the clamping ring 21, on the left in FIG. 2, and a conveyor plate 15 adapted to this dimension is selected. Alternatively, it is possible to adapt a conveyor plate 15 manufactured with a certain excess, by means of abrading or turning, exactly to the measured spacing. The conveyor plate 15 thus has, along with the circulating effect of the operating medium through the bearing gap of the roller bearing 11, the additional function of an adjustable compensation plate. Thereby, in the region of the roller bearing, a particularly compact construction is attained and the employment of additional packing plates or tolerance compensation plates is not needed.

The above described additional function of the conveyor plate 15 as compensation plate can of course be exploited with all the exemplary embodiments illustrated in FIGS. 2 to 9.

The exemplary embodiment illustrated in FIGS. 3 and 4 is distinguished in that the axial through-channels 30 are not formed at the periphery of the conveyor plate 15 but are formed lying radially further inward. The screening ring 23 can be omitted since the through-channels are closed also in the radial direction. The through-channels 30 illustrated in FIGS. 3 and 4 also rise radially conically in the direction towards the roller bearing 11, since the peripheral closure surface 35 of the through-channels 30 is formed to be inclined. Since the opposing, inner bounding surface 36 runs parallel to the drive shaft 10 or parallel to the axis of rotation of the cylinder drum 3, there is afforded a widening of the axial through-channels 30 in the direction towards the roller bearing 11. Thereby there is provided the already described advantage of a diffusor effect and further a relatively even distribution of the operating medium over the gap formed at the roller bearing 11. Preferably, the radial opening of the through-channels 30 on the roller bearing 11 side in substance matches the spacing d indicated in FIG. 2 between the inner bearing ring 22 and the outer bearing ring 31.

In the exemplary embodiment illustrated in FIGS. 5 and 6 the through-channels 30 formed at the periphery of the conveyor disk 15 are separated by means of blade-like elements 37. The blade-like elements 37 may be turned relative to the axis of rotation of the conveyor plate 15 in the manner of a turbine. Through the turbine-like configuration of the conveyor plate 15 there is provided particularly good conveying effect of the conveyor plate.

With the exemplary embodiments illustrated in FIGS. 7 and 8 on the one hand and in the FIGS. 9 and 10 on the other hand, the conveyor plate 15 has a conveying thread. The conveying thread consists of grooves 41 arranged in a spiral manner on the periphery 40 of the conveyor plate 15. In the exemplary embodiment illustrated in FIGS. 7 and 8, the grooves 41 extend in a spiral manner over the periphery 40 of the conveyor plate 15. This configuration is advantageous in particular for axial piston machines of relatively low speed of rotation. In comparison thereto, in the exemplary embodiment illustrated in FIGS. 9 and 10, the grooves 41 are inclined with a lesser angle of inclination with respect to the axis of rotation of the conveyor plate 15. This has the advantage of a low friction through-flow of the operating medium through the conveyor plate 15. This configuration is suitable in particular for axial piston machines of relatively high speed of rotation.

By means of the development in accordance with the invention there is provided for the roller bearing 11 of the axial piston machine lesser wear and a good cooling effect, so that the working life is significantly increased. Deposits at the sealing lip are avoided.

What is claimed is:

1. Axial piston machine, preferably of swash plate construction, having a revolving cylinder drum (3) arranged on a drive shaft (10) and working pistons (5) supported via slippers (6) on a swash plate (7), which may be adjustable in its tilt angle, in which machine the housing inner chamber (20 of the pump housing (1) filled with leakage operating medium is bounded by a roller bearing (11) by means of which the drive shaft (10) is mounted in the pump housing (1), whereby a shaft sealing arrangement (12) is arranged outside the roller bearing (11), and in which machine a device for conveying operating medium through the bearing gap of the roller bearing (11) is provided, characterized in that, there is provided before the bearing gap of the roller bearing (11), on the side towards the housing inner chamber (2), a conveyor plate (15) revolving with the drive shaft (10), which plate urges operating medium through the bearing gap into an annular space (17) between roller bearing (11) and shaft sealing arrangement (12) and in that the annular space (17) is connected with the housing inner chamber (2) through a discharge channel (18m 19), the roller bearing (11) has an inner bearing ring (22) which is axially fixed, at least on one side, to the drive shaft (10) by way of the conveyor plate (15) and a securing, means (21) engaging on the conveyor plate (15) on the side away from the roller bearing (11) whereby the conveyor plate (15), arranged between the inner bearing ring (22) and the securing means (21), serves as a compensating slate which can be adjusted in its axial dimension for compensation of the manufacturing tolerances which determine the axial seat of the inner bearing ring (22).

2. Axial piston machine according to claim 1, characterised in that,
the securing means is a clamping ring (21) engaging into a groove (34) of the drive shaft (10).

3. Axial piston machine according to claim 1, characterised in that,
the conveyor plate (15) is fixedly connected with the inner bearing ring (22).

4. Axial piston machine according to claim 1, characterised in that,
the conveyor plate (15) is arranged rotationally fixed on the drive shaft (10) directly neighbouring the roller bearing (11).

5. Axial piston machine according to claim 1, characterised by,
a configuration of the conveyor plate (15) such that it conveys operating medium through the bearing gap of the roller bearing (11) in both directions of rotation.

6. Axial piston machine according to claim 1, characterised by,
a configuration of the conveyor plate (15) as a centrifugal force conveying device.

7. Axial piston machine according to claim 1, characterised in that,
the conveyor plate (15) is provided with a number of axial through-channels (30), evenly distributed over the plate periphery, which channels rise radially conically towards the roller bearing (11) and are covered over by a screening ring (23) which widens conically towards the roller bearing (11).

8. Axial piston machine according to claim 1, characterised in that,
the conveyor plate (15) is provided with a number of axial through-channels (30) evenly distributed on a circle concentric with the drive shaft (10), which through-channels rise radially conically towards the roller bearing (11).

9. Axial piston machine according to claim 8, characterised in that,
the through-channels (30) widen in the direction towards the roller bearing (11).

10. Axial piston machine according to claim 1,
characterised in that, the conveyor plate (15) has a conveyor thread (41).

11. Axial piston machine according to claim 8, characterized in that, the through-channels (30) widen in the direction towards the roller bearing (11).

* * * * *